United States Patent
Yoshida et al.

[11] Patent Number: 6,136,471
[45] Date of Patent: *Oct. 24, 2000

[54] LITHIUM ION SECONDARY BATTERY HAVING FIRMLY ADHERENT LAYERS

[75] Inventors: Yasuhiro Yoshida; Kouji Hamano; Hisashi Shiota; Shou Shiraga; Shigeru Aihara; Takayuki Inuzuka; Michio Murai, all of Tokyo, Japan

[73] Assignee: Mitsubishi Denki Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/996,037

[22] Filed: Dec. 22, 1997

[30] Foreign Application Priority Data

Dec. 26, 1996 [JP] Japan .................................. 8-347600

[51] Int. Cl.[7] .................................................. H01M 4/58
[52] U.S. Cl. .................................. 429/218.1; 429/231.95; 429/233; 429/322; 429/126; 429/145; 429/162
[58] Field of Search ........................... 429/218.1, 231.95, 429/231.3, 231.4, 322, 145, 162, 126, 233, 231.1

[56] References Cited

U.S. PATENT DOCUMENTS

| | | | |
|---|---|---|---|
| 5,437,692 | 8/1995 | Dasgupta et al. | 29/623.1 |
| 5,512,389 | 4/1996 | Dasgupta et al. | 429/312 |
| 5,741,609 | 4/1998 | Chen et al. | 429/307 |
| 5,888,670 | 3/1999 | Kawakami | 429/231.4 |

*Primary Examiner*—Laura Weiner
*Attorney, Agent, or Firm*—Oblon, Spivak, McClelland, Maier & Neustadt, P.C.

[57] ABSTRACT

Positive and negative active material particles 7a and 9a are adhered to the respective current collectors 6 and 8 by means of a binder resin 11 to prepare positive and negative electrodes 3 and 5. The positive and negative electrode active material layers 7 and 9 are adhered to a separator 4 with the binder resin 11 so that the interlaminar strength between each active material layer 7, 9 and the separator 4 may be not lower than that between the active material layer 7, 9 and the respective current collector 10, 9. A lithium ion-containing electrolytic solution is held in voids 12 made in the active material layers 7, 9 and the separator 4 to complete an electrical connection between the electrodes.

12 Claims, 3 Drawing Sheets

LITHIUM ION SECONDARY BATTERY HAVING FIRMLY ADHERENT LAYERS

BACKGROUND OF THE INVENTION

1. Field of the Invention

This invention relates to a lithium ion secondary battery comprising a positive electrode and a negative electrode facing each other via a separator supporting an electrolyte. More particularly, it relates to a battery structure having improved electrical connections between each of a positive electrode and a negative electrode and a separator, which needs no hard metallic case and allows a battery to take an arbitrary shape, such as a thin shape.

2. Description of the Related Art

There has been an eager demand for reduction in size and weight of portable electronic equipment, and the realization relies heavily on improvement of battery performance. To meet the demand, development and improvement of a variety of batteries have been proceeding. Battery characteristics expected to be improved include increases in voltage, energy density, resistance to high load, freedom of shape, and safety. Out of available batteries, lithium ion batteries are secondary batteries that have achieved the most high voltage, the most high energy density, and the most excellent resistance to high load and will undergo successive improvements.

A lithium ion secondary battery mainly comprises a positive electrode, a negative electrode, and an ion conducting layer interposed between the electrodes. The lithium ion secondary batteries that have been put to practical use employ a positive electrode plate prepared by applying to an aluminum current collector a mixture comprising a powdered active material, such as a lithium-cobalt complex oxide, a powdered electron conductor, and a binder resin; a negative electrode plate prepared by applying to a copper current collector a mixture of a powdered carbonaceous active material and a binder resin; and an ion conducting layer made of a porous film of polyethylene, polypropylene, etc. filled with a nonaqueous solvent containing lithium ions.

FIG. 3 schematically illustrates the cross section of a conventional cylindrical lithium ion secondary battery disclosed, e.g., in JP-A-8-83608 (the term "JP-A" as used herein means an "unexamined published Japanese patent application"). In FIG. 3 reference numeral 1 indicates a battery case made of stainless steel, etc. which also serves as a negative electrode terminal, and numeral 2 an electrode body put into the battery case 1. The electrode body 2 is composed of a positive electrode 3, a separator 4, and a negative electrode 5 in a rolled-up form. In order for the electrode body 2 to maintain electrical connections among the positive electrode 3, the separator 4, and the negative electrode 5, it is necessary to apply pressure thereto from outside. This has been achieved by putting the electrode body 2 into the rigid case 1 which is to apply pressure thereby keeping the planar contacts among the above three elements. In the case of rectangular batteries, an external pressing force is imposed to a bundle of strips of an electrode body by, for embodiment, putting the bundle in a rectangular metal case.

That is, a contact between a positive electrode and a negative electrode with a separator therebetween in commercially available lithium ion secondary batteries has been made by using a hard case made of metal, etc. Without such a case, the electrode body would be separated, and the battery characteristics would be deteriorated due to a faulty electrical connection. However, because the case occupies a large proportion in the weight and volume of a battery, it contributes to not only reduction in energy density of the battery but limitation of the battery shape, making it difficult to make a battery of arbitrary shape.

Under such circumstances, development of lithium ion secondary batteries which do not require a hard case has been proceeding, aiming at reductions in weight and size (thickness). The key to development of batteries requiring no hard case is how to maintain an electrical connection between each of a positive electrode and a negative electrode and an ion conducting layer (i.e., separator) interposed therebetween without adding an outer force.

Connecting means requiring no outer force that have been proposed to date include a structure in which a positive electrode and a negative electrode are adhered together with a liquid adhesive composition (electrolyte gel) as disclosed in U.S. Pat. No. 5,460,904 and a structure in which a positive electrode and a negative electrode are formed by binding the respective active material with an electron conducting polymer, and the positive and negative electrodes are adhered together with a polymer electrolyte as disclosed in U.S. Pat. No. 5,437,692.

PROBLEM TO BE SOLVED BY THE INVENTION

As mentioned above, conventional lithium ion secondary batteries having the above-mentioned structure in which a hard case is used for ensuring intimate contacts and electrical connections between a positive electrode and a negative electrode and a separator have the problem that the case which does not participate in electricity generation has a large proportion in the total volume or weight of a battery, which is disadvantageous for production of batteries having a high energy density.

On the other hand, the structure in which electrodes are adhered with a liquid adhesive mixture is disadvantageous in that it makes the production process complicated, and sufficient adhesion is hardly obtained, and an improvement in mechanical battery strength is difficult to achieve.

The structure in which electrodes are adhered to a polyelectrolyte has the following disadvantages. The polyelectrolyte layer should be thick so as to avoid a short-circuit between the electrodes, failing to make a sufficiently thin battery. Further, it is difficult for such a solid electrolyte layer to adhere to the active material, hardly achieving improvements in battery characteristics, such as a charge and discharge efficiency. The production steps involved are complicated, making the battery expensive.

Efficiency of intercalation and deintercalation of lithium ions accompanying charge and discharge reactions of an active material is an important factor deciding the charge and discharge efficiency of a battery. Because, in a battery having an ordinary structure, mobility of lithium ions is equal throughout an electrolytic solution, intercalation and disintercalation of lithium ions occur deviationally in the vicinities of the electrode surfaces near the separator. As a result, the active material inside the electrode cannot be made effective use of, failing to obtain desired charge and discharge characteristics.

Hence, realization of a practically useful thin type lithium ion battery requires development of a battery structure that easily secures safety and strength as a battery and achieves satisfactory battery characteristics such as charge and discharge characteristics. In other words, it is required to develop a structure having a separator between electrodes so as to secure safety in which the separator is adhered to each electrode with sufficient strength so that satisfactory battery characteristics may be obtained.

SUMMARY OF THE INVENTION

In order to solve these problems, the inventors of the present invention have conducted extensive study on a favorable method for adhering a separator to each of a positive electrode and a negative electrode.

Accordingly, an object of the present invention is to provide a battery structure which makes it possible to adhere a separator to a positive electrode and a negative electrode firmly and intimately, thereby providing a lithium ion secondary battery which can have an increased energy density, a reduced thickness, and an arbitrary shape and yet exhibits excellent charge and discharge characteristics.

A first aspect of the lithium ion secondary battery according to the present invention in the battery comprising:

a positive electrode having a positive electrode collector and a positive electrode active material layer in which positive active material particles are dispersed and bound with a binder resin to the positive electrode collector;

a negative electrode having a negative electrode collector and a negative electrode active material layer in which negative active material particles are dispersed and bound with a binder resin;

a separator which is interposed between said positive electrode and said negative electrode and is adhered to each of positive and negative active material layers; and a lithium ion-containing electrolytic solution which is held in voids of said positive and negative electrode active material layers and said separator, wherein the adhesive strength between said separator and each of said positive and negative electrode active material layers is not lower than that between said positive electrode current collector and said positive electrode active material layer and that between said negative electrode current collector and said negative electrode active material layer.

A second aspect of a lithium ion secondary battery of the present invention is a battery according to the first aspect wherein each of said positive and negative electrode active material layers is adhered to said separator with the same binder resin as used for adhering each of said positive active material particles and said negative active material particles to the respective current collectors.

A third aspect of a lithium ion secondary battery of the present invention is a battery according to the first aspect wherein each of said positive and negative electrode active material layers is adhered to said separator with a second binder resin different from the binder resin used for adhering said positive active material particles and said negative active material particles to the respective current collectors.

A fourth aspect of a lithium ion secondary battery of the present invention is a battery according to the first aspect wherein the coating ratio of said binder resin on said active material particles is higher in the side of said separator than in the side of said current collector.

A fifth aspect of a lithium ion secondary battery of the present invention is a battery according to the first aspect wherein the density of the active material particles in each of the positive and negative electrode material layers in the side of the separator is lower than that of in the side of each of the positive and negative current collector.

A sixth aspect of a lithium ion secondary battery of the present invention is a battery according to the first aspect wherein the density of the binder resin in each of the positive and negative electrode material layers in the side of the separator is higher than that of in the side of each of the positive and negative current collector.

A seventh aspect of a lithium ion secondary battery of the present invention is a battery comprising:

a positive electrode having a positive electrode collector and a positive electrode active material layer in which particles of a positive active material are dispersed and bound with a binder resin to the positive electrode collector;

a negative electrode having a negative electrode collector and a negative electrode active material layer in which particles of a negative active material are dispersed and bound with a binder resin;

a separator which is interposed between said positive electrode and said negative electrode and is adhered to each of positive and negative active material layers; and a lithium ion-containing electrolytic solution which is held in voids of said positive and negative electrode active material layers and said separator, wherein the adhesive strength between said separator and each of said positive and negative electrode active material layers is not lower than that between said particles in each of said positive electrode active material layer and said negative electrode active material layer respectively.

An eighth aspect of a lithium ion secondary battery of the present invention is a battery according to the seventh aspect wherein the density of the active material particles in each of the positive and negative electrode material layers in the side of the separator is lower than that of in the side of each of the positive and negative current collector.

A ninth aspect of a lithium ion secondary battery of the present invention is a battery according to the seventh aspect wherein the density of the binder resin in each of the positive and negative electrode material layers in the side of the separator is higher than that of in the side of each of the positive and negative current collector.

A tenth aspect of a lithium ion secondary battery of the present invention is a battery according to the seventh aspect wherein the active material particles have a particle size in a range of 0.3 to 20 $\mu$m.

An eleventh aspect of a lithium ion secondary battery of the present invention is a battery according to the seventh aspect wherein the active material particles have a particle size in a range of 1 to 5 $\mu$m.

DETAILED DESCRIPTION OF THE PREFERRED EMBODIMENT

Embodiments for carrying out the present invention will be illustrated by referring to the accompanying drawing.

Figure 1:
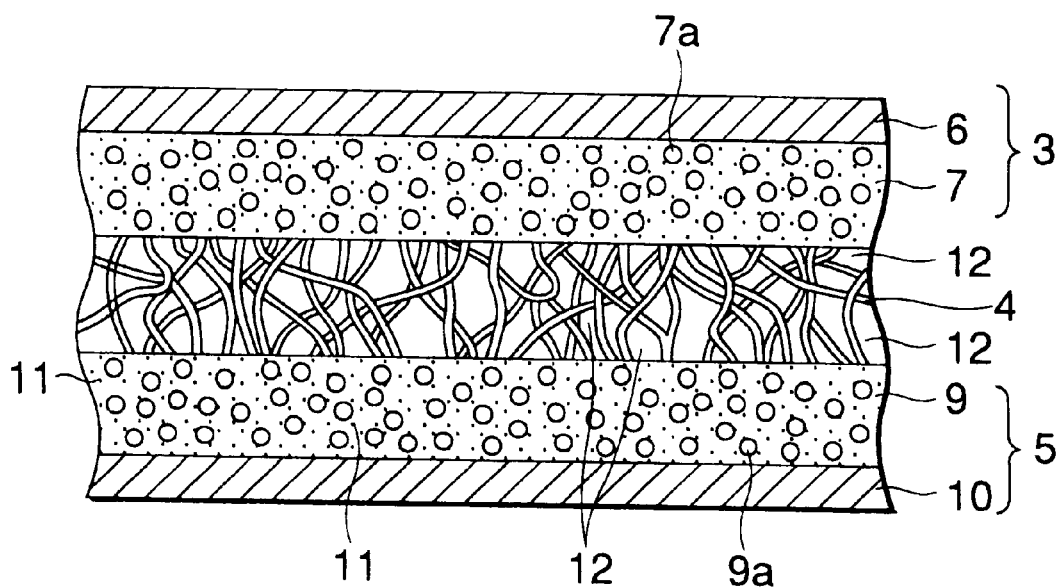
FIG. 1 is a schematic cross section of the main part of a lithium ion secondary battery according to one embodiment of the present invention.
Figure 2:
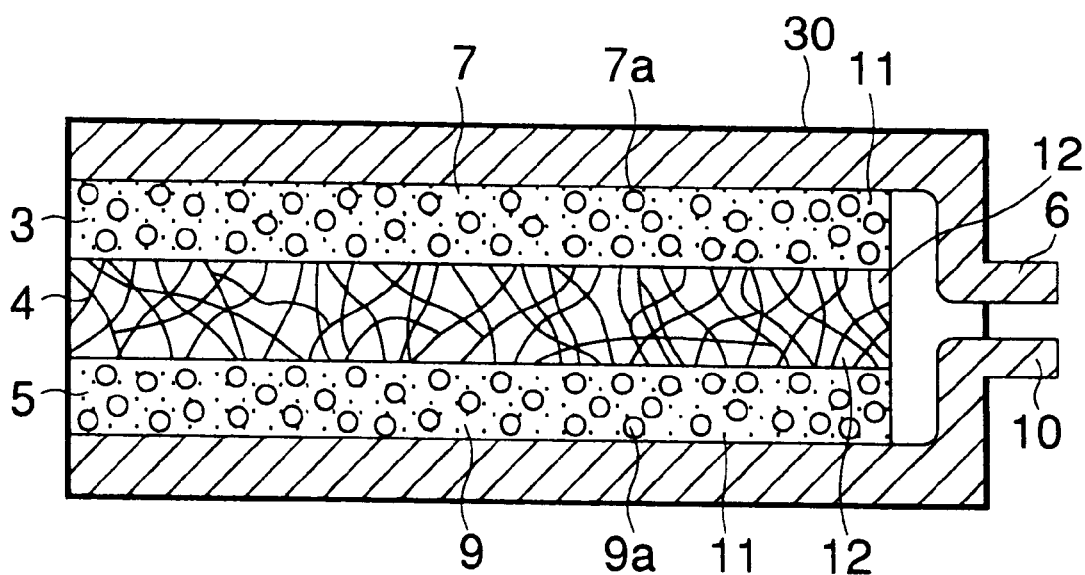
FIG. 2 is a schematic cross section of a lithium ion secondary battery according to the embodiment of FIG. 1.
Figure 3:
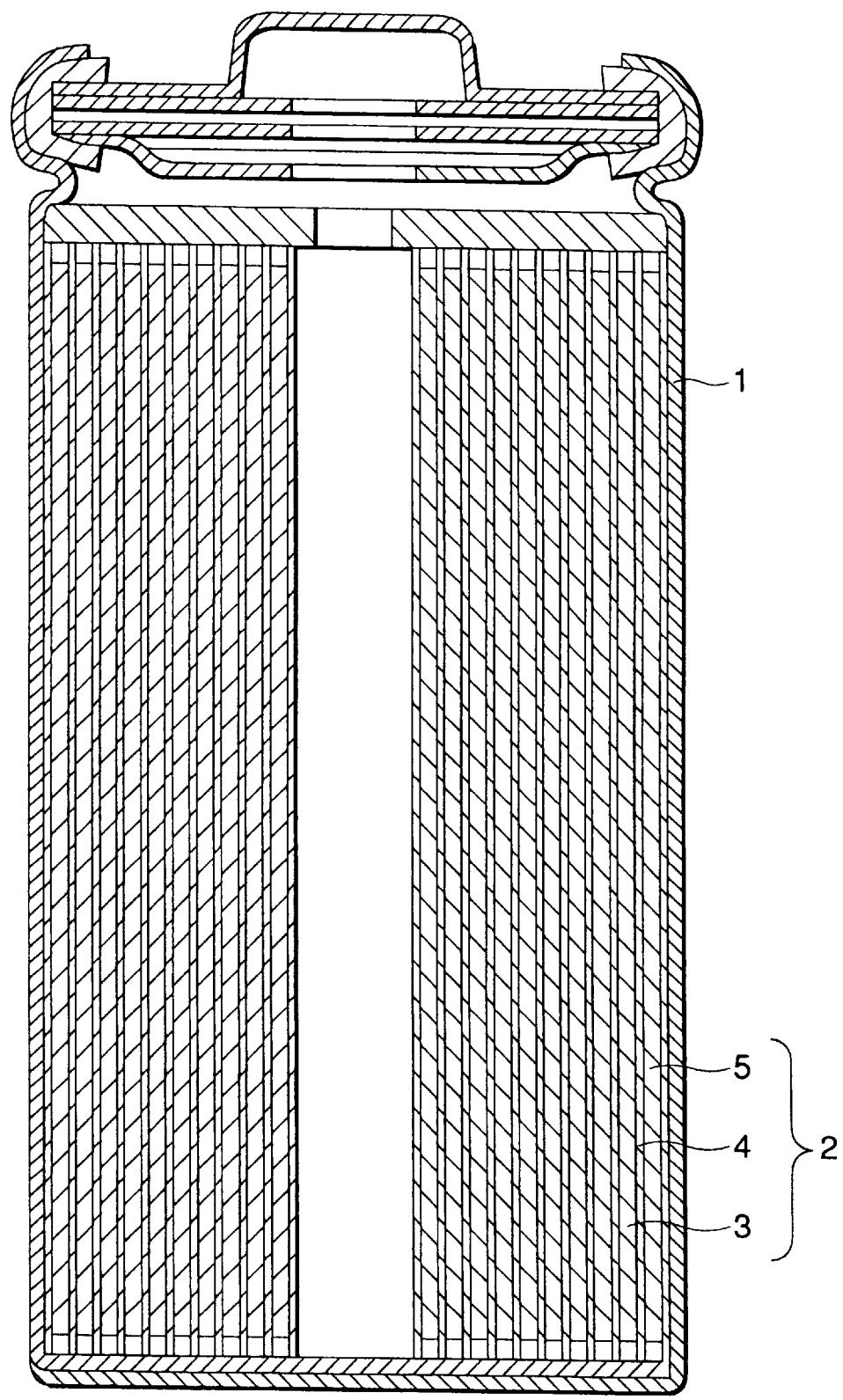
FIG. 3 is a schematic cross section of an embodiment of conventional lithium ion secondary batteries.

FIG. 1 is a schematic cross section of the main part (an electrode laminate) of a lithium ion secondary battery according to one embodiment of the present invention. FIG.

2 is a schematic cross section of a lithium ion secondary battery according to the embodiment of FIG. 1. In these Figures, numeral 3 indicates a positive electrode in which active material particles 7a are adhered to a current collector 6 by means of a binder resin 11. Numeral 7 is a positive electrode active material layer comprising active material particles 7a bound by a binder resin 11. Numeral 5 is a negative electrode in which active material particles 9a are adhered to a current collector 10 by means of a binder resin 11. Numeral 9 is a negative electrode active material layer comprising active material particles 9a bound by a binder resin 11. Numeral 4 indicates a separator that is interposed between the positive electrode 3 and the negative electrode 5 and is adhered to the positive and negative active material layers 7 and 9 with the binder resin 11. Numeral 12 indicates voids formed in the positive and negative active material layers 7 and 9 and the separator 4, where an electrolytic solution containing lithium ions is held. Numeral 30 is an aluminum laminate film which encloses and seals the electrode laminate shown in FIG. 1 after injection of the electrolytic solution.

The lithium ion secondary battery having the above-described structure can be produced by, for embodiment, as follows.

An active material paste prepared by dispersing positive electrode active material particles 7a and a binder resin 11 in a solvent is applied to a positive electrode current collector 6 by roll coating and dried to prepare a positive electrode 3. A negative electrode 6 is prepared in the same manner. The binder resin 11 is applied to the both sides of a separator 4 as an adhesive, and the positive electrode 3 and the negative electrode 6 are each adhered thereto. The adhesive is dried by hot roll pressing to prepare an electrode laminate. The whole electrode laminate is impregnated with an electrolytic solution by dipping and packed in an aluminum laminate film (resin coated aluminum film) 30. The film 30 is closed by heat sealing to obtain a lithium ion secondary battery.

In this embodiment, the adhesive strength between the separator 4 and each of the positive and negative electrode active material layers 7 and 9 is not lower than that between the positive electrode current collector 6 and the positive electrode active material layer 7 and that between the negative electrode current collector 10 and the negative electrode active material layer 9. Further, the coating ratio of the binder resin 11 on the active material particles 7a and 9a is higher in the side of the separator 4 than in the side of the current collector 6 and 10, respectively.

According to the above-described embodiment, the active materials and their respective collectors in the electrodes 3 and 5 are adhered together with the binder resin 11 to retain the shape of the electrodes as in conventional lithium ion secondary batteries. Since the positive and negative electrodes 3 and 5 (i. e. , the positive and negative electrode active material layers 7 and 9) are similarly adhered to the separator 4 with the same binder resin 11, electrical connections between each of the active material layers 7 and 9 and the separator 4 can be maintained without applying an outer force. That is, a hard case for retaining a battery structure is no more necessary, which makes it feasible to reduce the weight and thickness of a battery and to design the shape of a battery freely. Moreover, the separator 4 is adhered to each of the positive and negative active material layers 7 and 9 with such adhesive strength that is equal to or above the adhesive strength between the active material and its current collector in the inside of each electrode, i.e., between the positive electrode collector 6 and the positive electrode active material layer 7 and between the negative electrode current collector 10 and the negative electrode active material layer 9. As a result, fracture of the electrodes takes place preferentially over interlaminar delamination between the separator 4 and the positive and negative electrode active material layers 7 and 9. For example, when any outer force that may deform a battery or an internal thermal stress is applied, it is not the separator but the electrode structure that is broken, whereby safety can be secured.

In order to further enhance the adhesion between each electrode and the separator thereby to make the above effect more outstanding, it is preferable to form a thin binder resin layer between each electrode and the separator.

In addition, since the binder resin serving as an adhesive in the positive and negative electrode active material layers 7 and 9 is more abundant in the side (on the surface) of the separator 4. That is, the active material particles 7a and 9a which are positioned near the separator 4 are coated with the binder resin 11 more than those positioned near the respective collectors 6 and 10. While intercalation and disintercalation of lithium ions are usually supposed to occur preferentially in the vicinities of the separator over the inside of the positive and negative active material layers 7 and 9, the difference in coating ratio in the thickness direction of the electrode layer relaxes the difference in speed of intercalation and disintercalation of lithium ions between the separator 4 side and the inside of the positive and negative electrode active material layers 7 and 9. As a result, the active material inside the electrode can be utilized effectively to improve the charge and discharge efficiency. It follows that the charge and discharge characteristics as a battery can be improved.

The active material which can be used in the positive electrode includes complex oxides of lithium and a transition metal, such as cobalt, nickel or manganese; chalcogen compounds containing lithium or complex compounds thereof; and these complex oxides, Li-containing chalcogen compounds or complex compounds thereof that contain various dopant elements. While any substance capable of intercalating and disintercalating lithium ions, which take the main part of the battery behavior, can be used as a negative electrode active material, preferred active materials for use in the negative electrode include carbonaceous compounds, such as graphitizing carbon, non-graphitizing carbon, polyacene, and polyacetylene; and aromatic hydrocarbon compounds having an acene structure, such as pyrene and perylene.

The active materials are used in a powdered state. Particles having a particle size of 0.3 to 20 μm can be used. A preferred particle size is 1 to 5 μm. In the case that the particle size is too small, the ratio of the surface area of the active material particles coated with the binder resin becomes too high to perform lithium ion intercalation and disintercalation efficiently, resulting in reduction of battery characteristics. In the case that the particle size is too large, it is not easy to form the active material paste into a thin film, the packing density is reduced, and the surface of the electrode plates formed has large unevenness, resulting in a failure of sufficient adhesion to the separator.

The binder resin which can be used in binding the active material and forming into an electrode plate is not particularly limited as long as it is insoluble in an electrolytic solution and undergoes or induces no electrochemical reaction in the electrode laminate. Examples of useful binder resins are homo- or copolymers of vinylidene fluoride, ethylene fluoride, acrylonitrile, and ethylene oxide, and ethylene propylenediamine rubber.

Any metal stable within a battery can be used as a current collector. Aluminum is preferred for a positive electrode, and copper is preferred for a negative electrode. The current collector can be foil, net, expanded metal, etc. Those presenting a large surface area, such as net and expanded metal, are preferred from the standpoint of ease of holding an electrolytic solution after adhesion.

Any separator which is electron-insulating and has sufficient strength, such as porous film, net, and nonwoven fabric, can be used. In using a separator made of a fluorine resin, there are some cases in which the adhesive strength should be increased by surface treatment, such as plasma treatment. While not limiting, polyethylene or polypropylene is a preferred material for the separator for their adhesiveness and safety.

The solvent and the electrolyte which provide an electrolytic solution serving as an ion conductor can be any of nonaqueous solvents and any of lithium-containing electrolyte salts that have been employed in conventional batteries. Examples of useful solvents include ethers, such as dimethoxyethane, diethoxyethane, diethyl ether, and dimethyl ether; esters, such as propylene carbonate, ethylene carbonate, diethyl carbonate, and dimethyl carbonate; and mixed solvents consisting of two members selected from the ether solvents or the ester solvents or mixed solvents consisting of one member selected from the former group and one member selected from the latter group. Examples of useful electrolytes are $LiPF_6$, $LiAsF_6$, $LiClO_4$, $LiBF_4$, $LiCF_3SO_3$, $LiN(CF_3SO_2)_2$, and $LiC(CF_3SO_2)_3$.

The adhesive resin which can be used for adhering a current collector and an electrode can be selected from those insoluble in an electrolytic solution and undergoes or induces no electrochemical reaction in the electrode laminate similarly to the adhesive resins used for adhering an electrode and a separator. Examples of useful adhesive resins are crosslinked methacrylic or acrylic resins and homo- or copolymers of ethylene, styrene, vinylidene fluoride, etc.

Embodiments

The present invention will now be illustrated in greater detail with reference to Embodiments, but it should be understood that the present invention is not deemed to be limited thereto. Unless otherwise noted, all the percents and parts are by weight.

Embodiment 1

Eighty-seven (87) parts of $LiCoO_2$, 8 parts of graphite powder (KS-6, produced by Lonza Ltd), and, as a binder resin, parts of polyvinylidene fluoride (hereinafter abbreviated as PVDF) were dispersed in N-methylpyrrolidone (hereinafter abbreviated as NMP) to prepare a positive electrode active material paste. The paste was applied to 20 μm thick aluminum foil as a current collector by using a doctor blade method to a thickness of about 100 μm to prepare a positive electrode.

Ninety-five parts (95) of Mesophase Microbead Carbon (a trade name, produced by Osaka Gas Co., Ltd.) and, as a binder resin, 5 parts of PVDF were dispersed in NMP to prepare a negative electrode active material paste. The paste was applied to 12 μm thick copper foil as a current collector with a doctor blade to a thickness of about 100 μm to prepare a negative electrode.

A NMP solution containing 5% by weight of PVDF, which was used above as an binder resin for adhering active material particles onto a current collector, was uniformly coated to one side of a separator (Cellguard #2400, produced by Hoechst Celanese Plastics Ltd.), and the positive electrode was adhered thereon uniformly. On the other side of the separator was coated the same NMP solution of PVDF, and the negative electrode was adhered thereto. After the electrode laminate thoroughly dried, an electrolytic solution of lithium hexafluorophosphate (electrolyte) in a mixed solvent of ethylene carbonate and 1,2-dimethoxyethane was injected into the electrode laminate, and the impregnated laminate was heat-sealed in an aluminum laminate film pack to complete a lithium ion secondary battery.

The resulting battery stably retained its shape without imposing pressure externally, keeping an electrical connection between electrodes. When, after the assembly, the aluminum laminate film was removed, and the electrodes were peeled off the separator, the active material layers were found remaining on the separator. This proves that the interlaminar adhesive strength between the separator and the active material layer is greater than the interlaminar adhesive strength between the current collector and the active material layer. This seems to be because the binder resin as an adhesive was present more on the separator side than on the current collector side. In this manner, because fracture of the electrode(s) occurs preferentially over interlaminar delamination between the active material layer (s) and the separator, the battery can maintain safety.

On evaluating the battery characteristics, the energy density per unit weight was 120 Wh/kg owing to effective utilization of the active materials in the inside of the active material layers. Even after 200 charge and discharge cycles at a current of C/2, the charge capacity was as high as 75% of the initial level. This is believed to be because the binder resin was present more on the separator side than on the current collector side. In other words, the active material particles positioned nearer to the separator were coated with the binder resin to a larger extent than those positioned nearer to the current collector, so that the difference in speed of intercalation and disintercalation of lithium ions between the separator side and the inside of the electrode active material layers might be reduced by offsetting and, as a result, the active materials inside the electrodes were made effective use of.

Thus, since a hard battery case is no more necessary, it is feasible to produce batteries which can have reduced weight and thickness and an arbitrary shape. Besides, achievement of an improvement in charge and discharge efficiency enables production of lithium ion secondary batteries having excellent charge and discharge characteristics and high safety.

Embodiment 2

A battery was produced in the same manner as in Embodiment 1, except that the positive and negative electrode active material layers both had a thickness of about 200 μm. Similarly to Embodiment 1, the resulting battery stably retained its shape without imposing pressure externally, keeping an electrical connection between electrodes. When, after the assembly, the aluminum laminate film was removed, and the electrodes were stripped off the separator, the active material layers were found remaining on the separator, proving that the interlaminar adhesive strength between the separator and the active material layer is greater than the interlaminar adhesive strength between the current collector and the active material layer.

On evaluating the battery characteristics, the energy density per unit weight was 103 Wh/kg and, even after 200 charge and discharge cycles at a current of C/2, the charge capacity was as high as 60% of the initial level. It was thus proved that a lithium ion secondary battery having reduced weight and thickness, an arbitrary shape, and excellent charge and discharge characteristics could be produced similarly to Embodiment 1.

Embodiment 3

A battery was produced in the same manner as in Embodiment 1, except that a NMP solution containing 12% by weight of PVDF was used for adhesion of the positive and negative electrode active material layers to the separator. Similarly to Embodiment 1, the resulting battery stably retained its shape without imposing pressure externally, keeping an electrical connection between electrodes. When, after the assembly, the aluminum laminate film was removed, and the electrodes were peeled off the separator, the active material layers were found remaining on the separator, indicating that the interlaminar adhesive strength between the separator and the active material layer was greater than the interlaminar adhesive strength between the current collector and the active material layer. This is considered to be because a PVDF solution having a high concentration formed a thin PVDF layer between the separator and the electrode to enhance the interlaminar adhesive strength, maintaining an electrical connection stably.

On evaluating the battery characteristics, the energy density per unit weight was 90 Wh/kg and, even after 200 charge and discharge cycles at a current of C/2, the charge capacity was as high as 80% of the initial level. Similarly to Embodiment 1, it was proved that a lithium ion secondary battery having reduced weight and thickness, an arbitrary shape, and excellent charge and discharge characteristics could be produced.

Embodiment 4

Eighty-seven parts of $LiCoO_2$, 8 parts of graphite powder (KS-6, produced by Lonza Ltd.), and, as a binder resin, 5 parts of polystyrene powder were mixed, and appropriate amounts of toluene and 2-propanol were added thereto to prepare a positive electrode active material paste. The paste was applied to 20 μm thick aluminum foil as a current collector by using a doctor blade method to a thickness of about 100 μm to prepare a positive electrode.

Ninety-five parts of Mesophase Microbead Carbon (a trade name, produced by Osaka Gas Co., Ltd.) and, as a binder resin, 5 parts of polystyrene powder were mixed, and appropriate amounts of toluene and 2-propanol were added thereto to prepare a negative electrode active material paste. The paste was applied to 12 μm thick copper foil as a current collector by using a doctor blade method to a thickness of about 100 μm to prepare a negative electrode.

A toluene solution containing 5% by weight of polystyrene was uniformly applied to a side of a nitrocellulose porous film (pore size: 0.8 μm) as a separator, and the positive electrode was stuck thereto uniformly. On the other side of the separator was uniformly applied the same toluene solution of polystyrene, and the negative electrode was stuck thereto. After the electrode laminate thoroughly dried, an electrolytic solution of lithium hexafluorophosphate (electrolyte) in a mixed solvent of ethylene carbonate and 1,2-dimethoxyethane was injected into the electrode laminate, and the impregnated laminate was heat-sealed in an aluminum laminate film pack to complete a lithium ion secondary battery.

The resulting battery stably retained its shape without imposing pressure externally, keeping an electrical connection between electrodes. When, after the assembly, the aluminum laminate film was removed, and the electrodes were peeled off the separator, the active material layers were found remaining on the separator, indicating that the interlaminar adhesive strength between the separator and the active material layer was greater than the adhesive strength in the inside of the electrode and the interlaminar adhesive strength between the current collector and the active material layer. On evaluating the battery characteristics, the energy density per unit weight was about 90 Wh/kg, and even after 100 charge and discharge cycles at a current of C/10, about 60% of the initial charge capacity was retained. Similarly to Embodiment 1, it was proved that a lithium ion secondary battery having reduced weight and thickness, an arbitrary shape, and excellent charge and discharge characteristics could be produced.

Embodiment 5

A positive electrode and a negative electrode were prepared in the same manner as in Embodiment 1. A toluene solution containing 10% by weight of poly-methyl methacrylate, the same binder resin as used for adhering active material particles to the current collector, was used for adhering the electrodes to the separator. After the adhesion, the electrode laminate was dried in vacuum while heating at 80° C. The resulting battery stably retained its shape without imposing pressure externally, keeping an electrical connection between electrodes. When, after the assembly, the aluminum laminate film was removed, and the electrodes were peeled off the separator, the active material layers were found remaining on the separator, proving that the interlaminar adhesive strength between the separator and the active material layer was greater than the interlaminar adhesive strength between the current collector and the active material layer. On evaluating the battery characteristics, the energy density per unit weight was about 103 Wh/kg, and even after 100 charge and discharge cycles at a current of C/2, the charge capacity was as high as about 80% of the initial level.

Similarly to Embodiment 1, it was proved that a lithium ion secondary battery having reduced weight and thickness, an arbitrary shape, and excellent charge and discharge characteristics could be produced.

COMPARATIVE EXAMPLE 1

Eighty-seven (87) weight parts of $LiCoO_2$, 8 weight parts of graphite powder (KS-6, produced by Lonza Ltd), and, as a binder resin, 5 weight parts of PVDF were dispersed in NMP to prepare a positive electrode active material paste. The paste was applied to 20 μm thick aluminum foil as a current collector with a doctor blade to a thickness of about 100 μm to prepare a positive electrode.

Ninety-five (95) weight parts of Mesophase Microbead Carbon (a trade name, produced by Osaka Gas Co., Ltd.) and, as a binder resin, 5 weight parts of PVDF were dispersed in NMP to prepare a negative electrode active material paste. The paste was applied to 12 μm thick copper foil as a current collector with a doctor blade to a thickness of about 100 μm to prepare a negative electrode.

The aluminum foil coated with the positive electrode active material and the copper foil coated with the negative electrode active material were pressed, while wet, onto each side a separator (Cellguard #2400, produced by Hoechst Celanese Plastics Ltd.) and dried to prepare an electrode laminate having the separator as an interlayer. After the electrode laminate thoroughly dried, an electrolytic solution of lithium hexafluorophosphate (electrolyte) in a mixed solvent of ethylene carbonate and 1,2-dimethoxyethane was injected into the electrode laminate, and the impregnated laminate was heat-sealed in an aluminum laminate film pack to complete a lithium ion secondary battery.

The resulting battery stably retained its shape without imposing pressure externally, keeping an electrical connection between electrodes. When, after the assembly, the aluminum laminate film was removed, and the electrodes were peeled off the separator, the active material was found remaining on the separator only sparsely. This indicates that the interlaminar adhesive strength between the separator and the active material layer is very lower than to that between the current collector and the active material layer. On evaluating the battery characteristics, the energy density per unit weight was 70 Wh/kg. After 200 charge and discharge cycles at a current of C/2, the charge capacity was as low as 40% of the initial level. That is, the resulting battery was considerably inferior in battery characteristics to those produced in the foregoing Embodiments, which verifies that adhering of positive and negative electrodes to a separator with an adhesive results in improvements in battery characteristics. In other words, it can be seen that the distribution of an adhesive and a binder resin plays an important role in improving battery characteristics.

It is not necessary required to use a same binder resin as a binder resin which is used in electrode active material layer. A different material from that used in electrode active material layer of can be used as a binder resin to adhere a separator to a current collector. The first structure of the lithium ion secondary battery according to the present invention has a positive electrode comprising a current collector having adhered thereto positive electrode active material particles with a binder resin, a negative electrode comprising a current collector having adhered thereto negative electrode active material particles with a binder resin, a separator which is interposed between the positive electrode and the negative electrode and is adhered to each of positive and negative active material layers, and a lithium ion-containing electrolytic solution which is held in voids of the positive and negative electrode active material layers and the separator, in which the adhesive strength between the separator and each of the positive and negative electrode active material layers is not lower than that between the positive electrode current collector and the positive electrode active material layer and that between the negative electrode current collector and the negative electrode active material layer. According to this structure, a hard case for retaining a battery structure is no more necessary, which makes if feasible to reduce the weight and thickness of a battery and to design the shape of a battery freely. Additionally, since the charge and discharge efficiency can be improved, there is provided a lithium ion secondary battery having excellent charge and discharge characteristics and high safety.

The second structure of the lithium ion secondary battery according to the present invention has the first structure, in which each of the positive and negative electrode active material layers is adhered to the separator with the same binder resin used for adhering the positive electrode active material particles and the negative electrode active material particles to the respective current collectors. According to this structure, the battery has improved reliability.

The third structure of the lithium ion secondary battery according to the present invention has the first or second structure, in which the coating ratio of the binder resin on the active material particles is higher in the side of the separator than in the side of the current collector. According to this structure, the difference in speed of intercalation and disintercalation of lithium ions between the active material positioned near to the separator and that positioned near to the current collector can be relaxed so that the active material inside the electrode can be utilized effectively to bring about improved charge and discharge efficiency.

What is claimed is:

1. A lithium ion secondary battery comprising:
   a positive electrode having a positive electrode current collector and a positive electrode active material layer bound directly to the positive electrode current collector, where the positive electrode active material layer includes a binder resin and positive active material particles comprising Li dispersed in the binder resin;
   a negative electrode having a negative electrode current collector and a negative where the negative electrode active material layer includes a binder resin and negative active material particles dispersed in the binder resin;
   a separator which is interposed between said positive electrode and said negative electrode and is adhered to each of said positive and negative electrode active material layers; and
   a lithium ion-containing electrolytic solution which is held in voids of said positive and negative electrode active material layers and said separator,
   wherein an adhesive strength between said separator and each of said positive and negative electrode active material layers is not lower than that between said positive electrode current collector and said positive electrode active material layer and that between said negative electrode current collector and said negative electrode active material layer respectively; and
   wherein a coating ratio of said binder resin on said active material particles is higher on a surface of said separator than on a surface of said current collectors.

2. The lithium ion secondary battery according to claim 1, wherein each of said positive and negative electrode active material layers is adhered to said separator with the same binder resin as used for adhering each of said positive active material particles and said negative active material particles to the respective current collectors.

3. The lithium ion secondary battery according to claim 1, wherein each of said positive and negative electrode active material layers is adhered to said separator with a different binder resin than the binder resin used for adhering said positive active material particles and said negative active material particles to the respective current collectors.

4. The lithium ion secondary battery according to claim 1, wherein a density of the active material particles in each of the positive and negative electrode material layers on respective surfaces of the separator is lower than that on respective surfaces of each of the positive and negative current collectors.

5. The lithium ion secondary battery according to claim 1, wherein a density of the binder resin in each of the positive and negative electrode material layers on respective surfaces of the separator is higher than that on respective surfaces of each of the positive and negative current collectors.

6. A lithium ion secondary battery comprising:
   a positive electrode having a positive electrode current collector and a positive electrode active material layer bound directly to the positive electrode current collector, where the positive electrode active material layer includes a binder resin and positive active material particles comprising Li dispersed in the binder resin;
   a negative electrode having a negative electrode current collector and a negative electrode active material layer bound directly to the negative electrode current collector, where the negative electrode active material layer includes a binder resin and negative active material particles dispersed in the binder resin;

a separator which is interposed between said positive electrode and said negative electrode and is adhered to each of said positive and negative electrode active material layers; and a lithium ion-containing electrolytic solution which is held in voids of said positive and negative electrode active material layers and said separator, wherein an adhesive strength between said separator and each of said positive and negative electrode active material layers is not lower than that between said particles in each of said positive electrode active material layer and said negative electrode active material layer respectively; and wherein a coating ratio of said binder resin on said active material particles is higher on a surface of said separator than on a surface of said current collectors.

7. The lithium ion secondary battery according to claim 6, wherein a density of the active material particles in each of the positive and negative electrode material layers on respective surfaces of the separator is lower than that on respective surfaces of each of the positive and negative current collectors.

8. The lithium ion secondary battery according to claim 6, wherein a density of binder resin in each of the positive and negative electrode material layers on respective surfaces of the separator is higher than that on respective surfaces of each of the positive and negative current collectors.

9. The lithium ion secondary battery according to claim 6, wherein the active material particles have a particle size in a range of 0.3 to 20 $\mu$m.

10. The lithium ion secondary battery according to claim 6, wherein the active material particles have a particle size in a range of 1 to 5 $\mu$m.

11. A lithium ion secondary battery comprising:

a positive electrode having a positive electrode current collector and a positive electrode active material layer bound directly to the positive electrode current collector, where the positive electrode active material layer includes a binder resin and positive active material particles comprising Li dispersed in the binder resin;

a negative electrode having a negative electrode current collector and a negative electrode active material layer bound directly to the negative electrode current collector, where the negative electrode active material layer includes a binder resin and negative active material particles dispersed in the binder resin;

a separator which is interposed between said positive electrode and said negative electrode and is adhered to each of said positive and negative electrode active material layers; and a lithium ion-containing electrolytic solution which is held in voids of said positive and negative electrode active material layers and said separator, wherein an adhesive strength between said separator and each of said positive and negative electrode active material layers is not lower than that between said positive electrode current collector and said positive electrode active material layer and that between said negative electrode current collector and said negative electrode active material layer respectively; and wherein a density of the binder resin in each of the positive and negative electrode material layers on respective surfaces of the separator is higher than that on respective surfaces of each of the positive and negative current collectors.

12. A lithium ion secondary battery comprising:

a positive electrode having a positive electrode current collector and a positive electrode active material layer bound directly to the positive electrode current collector, where the positive electrode active material layer includes a binder resin and positive active material particles comprising Li dispersed in the binder resin;

a negative electrode having a negative electrode current collector and a negative electrode active material layer bound directly to the negative electrode current collector, where the negative electrode active material layer includes a binder resin and negative active material particles dispersed in the binder resin;

a separator which is interposed between said positive electrode and said negative electrode and is adhered to each of said positive and negative electrode active material layers; and a lithium ion-containing electrolytic solution which is held in voids of said positive and negative electrode active material layers and said separator, wherein an adhesive strength between said separator and each of said positive and negative electrode active material layers is not lower than that between said particles in each of said positive electrode active material layer and said negative electrode active material layer respectively; and wherein a density of the binder resin in each of the positive and negative electrode material layers on respective surfaces of the separator is higher than that on respective surfaces of each of the positive and negative current collectors.

* * * * *